US012612117B2

(12) United States Patent　　　(10) Patent No.:　US 12,612,117 B2
　　　Ito　　　　　　　　　　　　　　　　(45) Date of Patent:　　　Apr. 28, 2026

(54) VEHICLE BODY STRUCTURAL MEMBER

(71) Applicant: SUBARU CORPORATION, Tokyo (JP)

(72) Inventor: Hiroyasu Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 615 days.

(21) Appl. No.: 18/069,760

(22) Filed: Dec. 21, 2022

(65) Prior Publication Data

US 2023/0219635 A1　Jul. 13, 2023

(30) Foreign Application Priority Data

Jan. 11, 2022　(JP) ................................. 2022-002049

(51) Int. Cl.
　B62D 29/04　　　　(2006.01)
(52) U.S. Cl.
　CPC .................................... B62D 29/04 (2013.01)
(58) Field of Classification Search
　CPC ........ B62D 29/04; B62D 25/00; B62D 21/15; B62D 29/041; B62D 29/043; B62D 29/046
　USPC ....................................................... 428/36.14
　See application file for complete search history.

(56) References Cited

FOREIGN PATENT DOCUMENTS

| JP | 2009001238 | A | * | 1/2009 | |
| JP | 2018001890 | A | * | 1/2018 | |
| JP | 2019-098706 | A | | 6/2019 | |
| WO | WO-2015037443 | A1 | * | 3/2015 | .............. F16F 7/124 |

OTHER PUBLICATIONS

JP-2018001890-A machine translation (Year: 2018).*
WO-2015037443-A1 machine translation (Year: 2015).*
Machine translation of JP-2009001238-A (Year: 2009).*
Japanese Office Action Mailed Sep. 24, 2025 for Japanese Patent Application No. 2022-002049 (2 pages in Japanese; 3 pages English translation).

* cited by examiner

*Primary Examiner* — Vincent Tatesure
(74) *Attorney, Agent, or Firm* — Smith, Gambrell & Russell, LLP

(57)　　　　　　　ABSTRACT

A vehicle body structural member for a vehicle is provided on one or more of front and rear of a vehicle body, and made of a fiber-reinforced resin. The vehicle body structural member includes first and second members. The first member contains continuous fibers including first continuous fibers oriented along a vehicle body longitudinal direction and second continuous fibers oriented along a vehicle width direction. A content ratio of the first and second continuous fibers exceeds 50%. The second member contains continuous fibers including third continuous fibers oriented along a direction that is inclined, at a predetermined angle, left with respect to the vehicle body longitudinal direction and fourth continuous fibers oriented along a direction that is inclined, at the predetermined angle, right with respect to the vehicle body longitudinal direction. A content ratio of the third and fourth continuous fibers exceeds 50%.

8 Claims, 2 Drawing Sheets

VEHICLE BODY STRUCTURAL MEMBER

CROSS-REFERENCE TO RELATED APPLICATIONS

The present application claims priority from Japanese Patent Application No. 2022-002049 filed on Jan. 11, 2022, the entire contents of which are hereby incorporated by reference.

BACKGROUND

The disclosure relates to a vehicle body structural member made of a fiber-reinforced resin.

A vehicle body structure of a motor vehicle has front side members on left and right sides of a front of a vehicle body in a vehicle width direction. Recently, it has been considered to manufacture part of structural members that constitute the vehicle body using a fiber-reinforced resin containing reinforcement fibers such as carbon fibers for weight reduction of the vehicle body. In Japanese Unexamined Patent Application Publication (JP-A) No. 2009-001238, for example, an energy absorption structure capable of efficiently absorbing energy during a vehicle collision and holding rigidity is proposed. For example, JP-A 2009-001238 discloses a front side member where energy absorbers and rigidity holders each having a hollow member covered with a covering member are alternately disposed, the hollow member being a UD material configured to orient reinforcement fibers in one direction along an extension direction of a front member, the covering member having a first covering member and a second covering member forming an upper surface and other side surfaces of the front member, and the first covering member and the second covering member being a fiber-reinforced resin using a cloth material oriented to cross the extension direction of the front member.

SUMMARY

An aspect of the disclosure provides a vehicle body structural member for a vehicle. The vehicle body structural member is provided on one or more of a front of a vehicle body of the vehicle and a rear of the vehicle body, and made of a fiber-reinforced resin. The vehicle body structural member includes a first member and a second member. The first member contains continuous fibers including (i) first continuous fibers oriented along a vehicle body longitudinal direction and (ii) second continuous fibers oriented along a vehicle width direction. A content ratio of the first continuous fibers and the second continuous fibers with respect to the continuous fibers contained in the first member exceeds 50%. The second member contains continuous fibers including (i) third continuous fibers oriented along a direction that is inclined with respect to the vehicle body longitudinal direction and the vehicle width direction and is inclined, at a predetermined angle, left with respect to the vehicle body longitudinal direction and (ii) fourth continuous fibers oriented along a direction that is inclined with respect to the vehicle body longitudinal direction and the vehicle width direction and is inclined, at the predetermined angle, right with respect to the vehicle body longitudinal direction. A content ratio of the third continuous fibers and the fourth continuous fibers with respect to the continuous fibers contained in the second member exceeds 50%. The first member is disposed outside in the vehicle width direction.

The second member is disposed inside in the vehicle width direction. The first member and the second member are joined to each other.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Each of the front side members described in JP-A 2009-001238 is mainly designed to absorb the energy against a collision from the front (hereinafter, also "frontal collision") in a vehicle body longitudinal direction and to hold rigidity. Therefore, the energy absorption may be insufficient against a collision, such as an oblique collision or an offset collision, from a diagonal direction with respect to the vehicle body longitudinal direction. This may prevent a reduction in a shock transmitted to a vehicle passenger. Likewise, it is desired that rear side members provided on the left and right sides of a rear of the vehicle body can appropriately absorb energy and hold rigidity against a collision from a rear (hereinafter, "rear-end collision") in the vehicle body longitudinal direction and a collision from the diagonal direction.

The disclosure has been, therefore, made in light of the problems. An object of the disclosure is to provide a vehicle body structural member provided on each of left and right sides of a front of a vehicle body or of a rear of the vehicle body and capable of exhibiting energy absorption performance and rigidity holding performance against not only a collision from a vehicle body longitudinal direction but also a collision from a diagonal direction.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
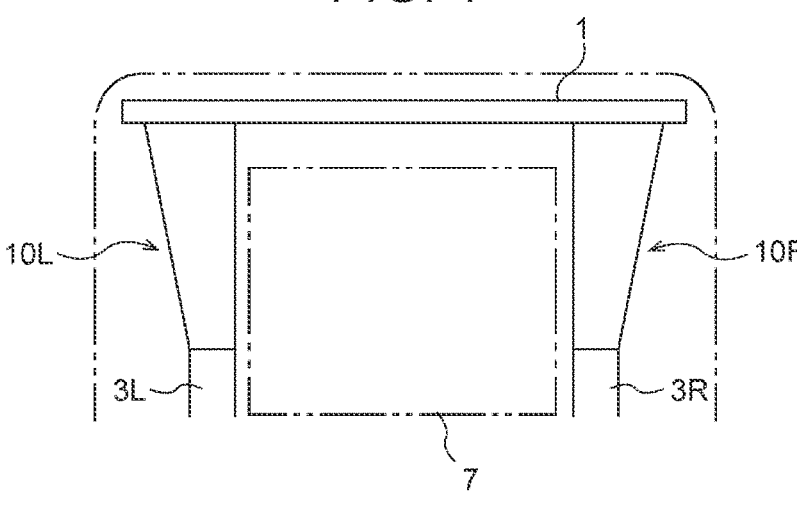
FIG. 1 is a schematic diagram illustrating a vehicle body front structure including vehicle body structural members according to an embodiment of the disclosure.

FIG. 1 is a schematic diagram illustrating a vehicle body front structure including vehicle body structural members (hereinafter, also simply "structural members") 10L, 10R according to an embodiment of the disclosure. The vehicle body front structure illustrated in FIG. 1 includes structural members 10L, 10R joined to left and right sides of a rear surface of a bumper beam 1. The structural members 10L, 10R each include a fiber-reinforced resin composite. Front sides of the structural members 10L, 10R are joined to the bumper beam 1, while rear sides are joined to support members 3L, 3R, respectively. The support members 3L, 3R may be structures supporting the structural members 10L, 10R on rear sides and are not limited to specific members. The support members 3L, 3R may be, for example, structural members such as side members provided left and right, respectively.

The structural members 10L, 10R may be joined to the bumper beam 1 and the support members 3L, 3R each by, for example, an adhesive or a fastening member such as a bolt and a nut. The structural members 10L, 10R are located below the front of the vehicle body and an internal combustion engine, a drive motor, a transmission, and the like are disposed above the structural members 10L, 10R. The structural members 10L, 10R absorb input energy for mitigating a shock applied to a vehicle passenger and to hold the rigidity for protecting the passenger during a vehicle collision.

Figure 2:
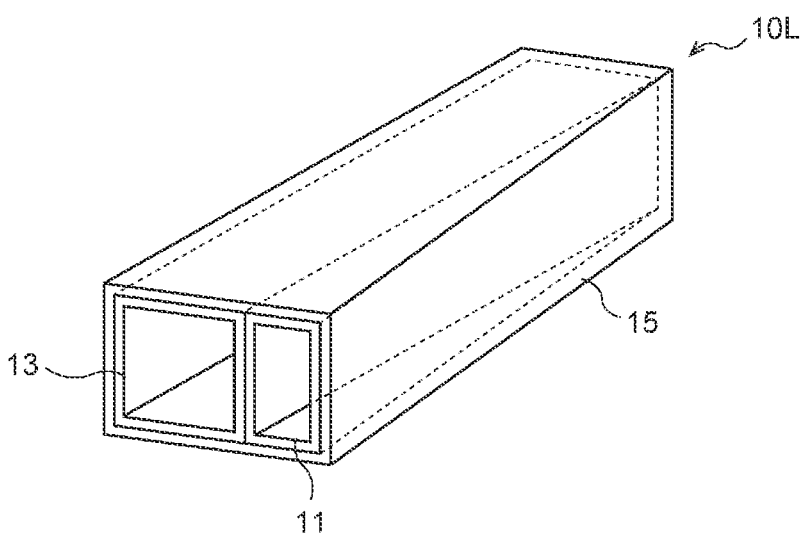
FIG. 2 is a perspective view of the structural member according to the embodiment viewed from a front side.
Figure 3:
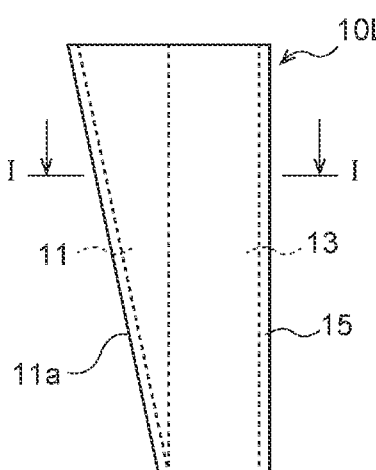
FIG. 3 is a plan view of the structural member according to the embodiment viewed from above.
Figure 4:
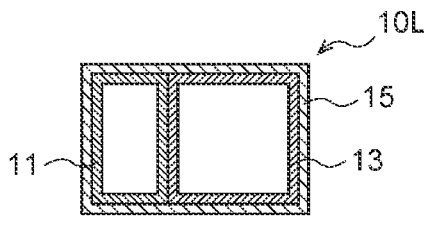
FIG. 4 is a cross-sectional view of a cross-section I-I of FIG. 3 in an arrow direction.
Figure 5:
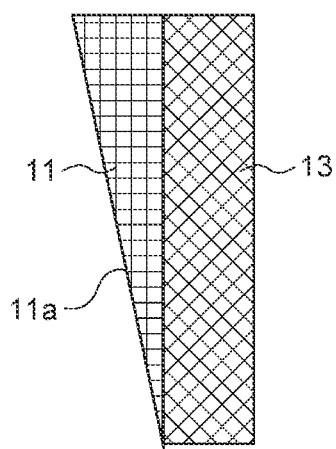
FIG. 5 is a plan view of a first member and a second member of the structural member according to the embodiment from above.

FIGS. 2 to 5 illustrate the structural member 10L provided on the left side of the vehicle body front structure. FIG. 2 is a perspective view of the structural member 10L from the front, FIG. 3 is a plan view of the structural member 10L from above, and FIG. 4 is a cross-sectional view of a cross-section I-I of FIG. 3 in an arrow direction. FIG. 5 is a plan view of a first member 11 and a second member 13 from above.

The structural member 10L includes the first member 11, the second member 13, and a covering member 15. The first member 11, the second member 13, and the covering member 15 each contain a fiber-reinforced resin composite. Out of the elements, one or more of the first member 11 and the second member 13 contain continuous fibers oriented in a predetermined direction. While examples of reinforcement fibers include carbon fibers, the reinforcement fibers may be the other fibers, or a combination of multiple types of fibers may be used as the reinforcement fibers. However, the reinforcement fibers desirably contain the carbon fibers, which are particularly superior in mechanical characteristics.

A thermoplastic resin or a thermosetting resin is used as a matrix resin of the fiber-reinforced resin. Examples of the thermoplastic resin include a polyethylene resin, a polypropylene resin, a polyvinyl chloride resin, an ABS resin (acrylonitrile-butadiene-styrene copolymer synthetic resin), a polystyrene resin, an AS resin (acrylonitrile-styrene copolymer synthetic resin), a polyamide resin, a polyacetal resin, a polycarbonate resin, a polyester resin, a PPS (polyphenylene sulfide) resin, a fluorocarbon resin, a polyetherimide resin, a polyether ketone resin, and a polyimide resin.

One or a mixture of two types or more of the thermoplastic resins can be used as the matrix resin. Alternatively, the matrix resin may be a copolymer of these thermoplastic resins. When the mixture of the thermoplastic resins is used, a compatibilizer may be added to the mixture. Furthermore, a fire retardant such as a bromine-based fire retardant, a silicon-based fire retardant, or red phosphorus may be added to the thermoplastic resin(s).

Examples of the thermosetting resin include an epoxy resin, an unsaturated polyester resin, a vinyl ester resin, a phenol resin, a polyurethane resin, and a silicon resin. One or a mixture of two types or more of the thermosetting resins can be used as the matrix resin. When one or more of these thermosetting resins are used, a curing agent and a reaction accelerator may be added as appropriate to the thermosetting resin(s).

The first member 11 is disposed outside in a vehicle width direction and formed into a hollow cylindrical shape at a cross-sectional area gradually reduced from the front side to a rear side of the vehicle body. That is, the first member 11 of the structural member 10L provided left on the front of the vehicle body is disposed left of the vehicle body. The first member 11 of the structural member 10R provided right on the front of the vehicle body is disposed right of the vehicle body. In the present embodiment, a shape of a rear side of the first member 11 is at an acute angle when viewed from above. The rear side of the first member 11 may also have a thickness enough to have a predetermined cross-sectional area. The first member 11 contains continuous fibers including (i) first continuous fibers oriented along the vehicle body longitudinal direction and (ii) second continuous fibers oriented along the vehicle width direction. A content ratio of the first continuous fibers and the second continuous fibers with respect to the continuous fibers contained in the first member 11 exceeds 50%.

It is assumed, for example, that the first member 11 is formed by a lay-up method of stacking multiple fiber-reinforced resin sheets (prepregs). In this case, the stacking numbers of fiber-reinforced resin sheets (cloth materials) containing the first continuous fibers oriented along the vehicle body longitudinal direction and the second continuous fibers oriented along the vehicle width direction are designed so that the content ratio of the first continuous fibers and the second continuous fibers exceeds 50%. Alternatively, when the first member 11 is formed by the lay-up method, the arrangement directions and the stacking numbers of the fiber-reinforced resin sheets (UD materials) containing the continuous fibers oriented in one direction are designed so that the content ratio of first continuous fibers oriented along the vehicle body longitudinal direction and second continuous fibers oriented along the vehicle width direction exceeds 50%.

Figure 6:
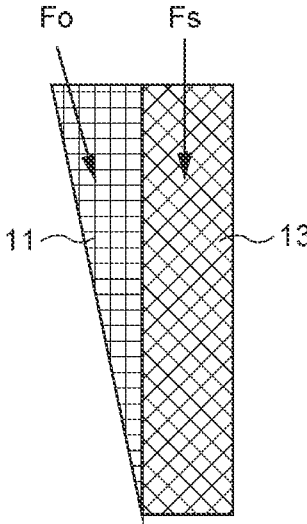
FIG. 6 illustrates operation of the structural member according to the embodiment.

The first member 11 contains the continuous fibers including (i) the first continuous fibers oriented along the vehicle body longitudinal direction and (ii) the second continuous fibers oriented along the vehicle width direction. The content ratio of the first continuous fibers and the second continuous fibers with respect to the continuous fibers contained in the first member 11 exceeds 50%. Owing to this, the first member 11 is excellent in strength characteristics against a load Fs in the vehicle body longitudinal direction and also excellent in energy absorption characteristics against a load Fo from the diagonal direction with respect to the vehicle body longitudinal direction (refer to FIG. 6).

The second member 13 is disposed inside the vehicle width direction and formed into a hollow cylindrical shape with an axial direction along the vehicle body longitudinal direction. That is, the second member 13 of the structural member 10L provided left of the front of the vehicle body is disposed right of the first member 11. As for the structural member 10R provided right of the front of the vehicle body, the second member 13 is disposed left of the first member

11. An end of a rear side of the second member 13 is supported by the support member 3L. In the present embodiment, a cross-sectional area of the second member 13 is constant from a front side to the rear side of the vehicle body, but the cross-sectional area may change halfway. The second member 13 contains continuous fibers including (i) third continuous fibers oriented along a direction that is inclined with respect to the vehicle body longitudinal direction and the vehicle width direction and is inclined at a predetermined angle left with respect to the vehicle body longitudinal direction and (ii) fourth continuous fibers oriented along a direction that is inclined with respect to the vehicle body longitudinal direction and the vehicle width direction and is inclined at the predetermined angle right with respect to the vehicle body longitudinal direction. A content ratio of the third continuous fibers and the fourth continuous fibers with respect to the continuous fibers contained in the second member exceeds 50%.

It is assumed, for example, that the second member 13 is formed by the lay-up method of stacking multiple fiber-reinforced resin sheets (prepregs). In this case, the stacking numbers of fiber-reinforced resin sheets (cloth materials) containing (i) the third continuous fibers oriented along the direction that is inclined at the predetermined angle left with respect to the vehicle body longitudinal direction and (ii) the fourth continuous fibers oriented along the direction that is inclined at the predetermined angle right with respect to the vehicle body longitudinal direction are designed so that the content ratio of the third continuous fibers and the fourth continuous fibers exceeds 50%. Alternatively, when the second member 13 is formed by the lay-up method, the arrangement directions and the stacking numbers of the fiber-reinforced resin sheets (UD materials) containing continuous fibers oriented in one direction are designed so that the content ratio of (i) the third continuous fibers oriented along the direction that is inclined at the predetermined angle left with respect to the vehicle body longitudinal direction and (ii) the fourth continuous fibers oriented along the direction that is inclined at the predetermined angle right with respect to the vehicle body longitudinal direction exceeds 50%. Furthermore, the second member 13 may be formed by a method of winding continuous fibers impregnated with the matrix resin around a jig, such as a filament winding method.

The second member 13 contains the continuous fibers including (i) the third continuous fibers oriented along the direction that is inclined at the predetermined angle left with respect to the vehicle body longitudinal direction and (ii) the fourth continuous fibers oriented along the direction that is inclined at the predetermined angle right with respect to the vehicle body longitudinal direction. The content ratio of the third continuous fibers and the fourth continuous fibers with respect to the continuous fibers contained in the second member exceeds 50%. Owing to this, the second member 13 is excellent in strength characteristics against the load Fo from the diagonal direction with respect to the vehicle body longitudinal direction and also excellent in energy absorption characteristics against the load Fs in the vehicle body longitudinal direction (refer to FIG. 6). A rear end of the second member 13 is supported by the support member 3L. This enables the second member 13 to exhibit the energy absorption characteristics effectively when a collision load is applied to the second member 13 from the front of the vehicle.

In some embodiments, inclination angles of the third and fourth continuous fibers of the second member 13, which are oriented along the directions that are inclined left and right at the predetermined angle with respect to the vehicle body longitudinal direction, are designed in a range, for example, from 30° to 45°. The inclination angles affect a way of crushing responsive to a load input from the front of the vehicle body. The inclination angles also affect the strength characteristics against a load input from diagonally forward left of the vehicle body. Therefore, the inclination angles may be designed so that the second member 13 has desired energy absorption characteristics against the load input from the front of the vehicle body and desired strength characteristics against the load input from the diagonally forward left of the vehicle body. It is to be noted, however, that designing the inclination angles in the range from 30° to 45° enables the second member 13 to exhibit the energy absorption characteristics against the load input from the front of the vehicle body and the strength characteristics against the load input from the diagonally forward left of the vehicle body in balance.

In the present embodiment, the first member 11 has a pyramid shape and the second member 13 has a quadrangular prism shape. The first member 11 is joined in a planar manner to the second member 13. In addition, the covering member 15 is wrapped around the first member 11 and the second member 13 with a planar joint between the first member 11 and the second member 13. Therefore, the first member 11 is held along with the second member 13. The covering member 15 may be either made of a fiber-reinforced resin containing continuous fibers or made of a fiber-reinforced resin containing short or long fibers. Alternatively, the covering member 15 may be made of a resin that does not contain reinforcement fibers. Designing lengths or orientation directions of the fibers contained in the covering member 15 as appropriate enables different energy absorption characteristics and different load bearing characteristics to be imparted on each structural member 10.

Furthermore, because of the planar joint between the first member 11 and the second member 13 on joint surfaces extending in a vehicle body height direction, the second member 13 having the high strength characteristics against the load from the diagonal direction can support the first member 11 when the collision load is applied from the left front of the vehicle body. It is thereby possible to assist in axial crushing of the first member 11 and to cause the first member 11 to exhibit the energy absorption characteristics effectively.

Moreover, in the present embodiment, when each structural member 10 is viewed from the vehicle body height direction, the first member 11 includes contour lines, and among the contour lines, a contour line 11a (refer to FIGS. 3 and 5) of the first member 11 located outside in the vehicle width direction becomes closer to the inside in the vehicle width direction as being farther from a left front corner of the vehicle body. In addition, an area of a cross-section orthogonal to the contour line 11a increases away from the corner. For this reason, when the collision load is applied from the left front of the vehicle body, the first member 11 can be easily crushed consecutively from the corner of the first member 11 after the start of crushing the first member 11, thus allowing the first member 11 to exhibit the energy absorption characteristics effectively.

The structural member 10R provided right of the front of the vehicle body has configurations in a way such that the structural member 10L provided left of the front of the vehicle body is laterally inverted. Therefore, the structural member 10R can obtain similar effects to those of the structural member 10L.

Furthermore, rear side members provided left and right on the rear of the vehicle body could be configured in accordance with the configurations of the structural members 10L, 10R. In one example, each rear side member is configured as follows. The first member is disposed outside in the vehicle width direction and the second member is disposed inside in the vehicle width direction. When the first member is viewed from the vehicle body height direction, the first member includes contours, and among the contour lines, a contour line located outside in the vehicle width direction becomes closer to the inside of the vehicle width direction as being farther from the corner of the vehicle body. In addition, an area of a cross-section orthogonal to the contour line increases away from the corner. That is, the rear side member is configured similarly to a case where an upper side of FIG. 1 is assumed as the rear side of the vehicle body.

With these configurations, the structural members provided on the rear side of the vehicle body and made of the fiber-reinforced resin can exhibit excellent energy absorption characteristics against both the collision load from the rear of the vehicle body and the collision load from the diagonal direction. In addition, the structural members can hold predetermined rigidity against both the collision load from the rear of the vehicle body and the collision load from the diagonal direction.

In a space inside one or more of the first member 11 and the second member 13, another member for enhanced rigidity or control over the energy absorption characteristics may be disposed.

While the embodiment of the disclosure has been described in detail with reference to the accompanying drawings, the disclosure is not limited to the embodiment. It is evident that a person having ordinary skill in the art to which the disclosure pertains could conceive of examples of various modifications or revisions within the scope of the technical concept set forth in the claims. It would be understood that these modifications or revisions naturally fall in the technical range of the disclosure. Furthermore, modes of combinations of the embodiment with the modifications naturally fall in the technical scope of the disclosure.

The invention claimed is:

1. A vehicle body structural member for a vehicle, the vehicle body structural member being provided on one or both of a front of a vehicle body of the vehicle and a rear of the vehicle body, and made of a fiber-reinforced resin, the vehicle body structural member comprising:

a first member containing continuous fibers comprising (i) first continuous fibers oriented along a vehicle body longitudinal direction and (ii) second continuous fibers oriented along a vehicle width direction, wherein a content ratio of the first continuous fibers and the second continuous fibers with respect to the continuous fibers contained in the first member exceeds 50%; and a second member containing continuous fibers comprising (i) third continuous fibers oriented along a direction that is inclined with respect to the vehicle body longitudinal direction and the vehicle width direction and is inclined, at a predetermined angle, left with respect to the vehicle body longitudinal direction and (ii) fourth continuous fibers oriented along a direction that is inclined with respect to the vehicle body longitudinal direction and the vehicle width direction and is inclined, at the predetermined angle, right with respect to the vehicle body longitudinal direction, wherein a content ratio of the third continuous fibers and the fourth continuous fibers with respect to the continuous fibers contained in the second member exceeds 50%, wherein the first member is disposed outside in the vehicle width direction, the second member is disposed inside in the vehicle width direction, and the first member and the second member are joined to each other, and wherein the first member has a hollow cylindrical shape with a cross-sectional area that continuously reduces from a front end of the first member in the vehicle body longitudinal direction to a rear end of the first member in the vehicle body longitudinal direction.

2. The vehicle body structural member according to claim 1, wherein inclination angles of the third and fourth continuous fibers of the second member with respect to the vehicle body longitudinal direction are in a range from 30° to 45°.

3. The vehicle body structural member according to claim 1, wherein each of the first member and the second member has a hollow cross-section, and the first member is joined to the second member in a planar manner.

4. The vehicle body structural member according to claim 3, wherein the planar joining includes abutting continuous fiber planar walls of the respective first and second members, with the abutting planar walls extending in a vehicle body height direction.

5. The vehicle body structural member according to claim 1, wherein each of the hollow cross-sectioned first and second members have cylindrical closed cross-sections.

6. The vehicle body structural member according to claim 1, further comprising a wrap that extends entirely around each of the first and second members and has a hollow closed cylindrical shape.

7. The vehicle body structural member according to claim 1, wherein each of the first and second members has an axis of elongation extending along the vehicle body length.

8. The vehicle body structural member according to claim 1, wherein the second member is comprised of wound continuous fibers forming a closed cylindrical hollow member.

\* \* \* \* \*